US012351020B2

(12) United States Patent
Pfeffer et al.

(10) Patent No.: US 12,351,020 B2
(45) Date of Patent: Jul. 8, 2025

(54) DRIVE UNIT FOR AN ELECTRIC VEHICLE (71) Applicant: ZF Friedrichshafen AG, Friedrichshafen (DE)

(72) Inventors: Andreas Pfeffer, Viechtach (DE); Alexander Mühlbauer, Windorf (DE); Franz Reitinger, Esternberg (AT); Tobias Brilka, Iggensbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 224 days.

(21) Appl. No.: 17/822,859

(22) Filed: Aug. 29, 2022

(65) Prior Publication Data

US 2023/0060296 A1 Mar. 2, 2023

(30) Foreign Application Priority Data

Sep. 1, 2021 (DE) ...................... 10 2021 209 593.3

(51) Int. Cl.
*B60K 17/34* (2006.01)
*B60K 1/02* (2006.01)
(Continued)

(52) U.S. Cl.
CPC .............. *B60K 17/346* (2013.01); *B60K 1/02* (2013.01); *B60K 17/08* (2013.01); *F16H 37/0806* (2013.01); *B60Y 2200/91* (2013.01)

(58) Field of Classification Search
CPC .. B60K 17/346; B60K 17/3467; B60K 17/08; B60K 17/165; B60K 1/02;
(Continued)

(56) References Cited

U.S. PATENT DOCUMENTS 9,719,584 B1 * 8/2017 Duan ..................... B60K 17/02
11,124,064 B2 9/2021 Kaltenbach et al.
(Continued)

FOREIGN PATENT DOCUMENTS

DE 1017220073 A1 10/2018
DE 1019202994 A1 9/2020
(Continued)

OTHER PUBLICATIONS

German Patent Office, Search Report issued in German patent application No. 10 2021 209 593.3 (Apr. 14, 2022).

*Primary Examiner* — Farhana Pervin
(74) *Attorney, Agent, or Firm* — Finch & Maloney PLLC (57) ABSTRACT

A drive unit for an electric vehicle has at least one electric machine, a multi-speed transmission, and a distributor device. The rotor of each electric machine is connected to an associated input shaft of the multi-speed transmission. The multi-speed transmission is connected on the output side to the distributor device with different transmission ratios being selectable in the multi-speed transmission. In addition, a drive power introduced into the distributor device can be distributed to at least two outputs of the distributor device. In order to provide a compact drive unit for an electric vehicle with permanent all-wheel drive or selectable all-wheel drive, the distributor device can be used to provide a longitudinal distribution of the introduced drive power in that the outputs of the distributor device are each provided for coupling to a respective drive axle of the electric vehicle.

16 Claims, 5 Drawing Sheets

(51) Int. Cl.
*B60K 17/08* (2006.01)
*B60K 17/346* (2006.01)
*F16H 37/08* (2006.01)

(58) Field of Classification Search
CPC ..... F16H 2200/2007; F16H 2200/2064; F16H 2200/2094; F16H 2200/2097; F16H 37/0806; F16H 2200/0021; F16H 3/66; B60Y 2200/91
See application file for complete search history.

(56) References Cited

U.S. PATENT DOCUMENTS

| | | | |
|---|---|---|---|
| 2019/0234471 A1* | 8/2019 | Yoshino | F16D 11/14 |
| 2019/0283564 A1* | 9/2019 | Kaltenbach | F16H 3/66 |
| 2020/0262293 A1* | 8/2020 | Glückler et al. | B60K 1/02 |
| 2020/0317046 A1* | 10/2020 | Flaxman | B60K 17/16 |
| 2021/0123512 A1 | 4/2021 | Glückler et al. | |
| 2021/0252987 A1* | 8/2021 | Brenninger | F15B 15/18 |
| 2022/0250462 A1* | 8/2022 | Bayoux | B60K 6/44 |
| 2022/0267990 A1* | 8/2022 | Fliearman | E02F 9/202 |
| 2023/0100344 A1* | 3/2023 | Schilder | B60K 1/00 475/205 |
| 2024/0026960 A1* | 1/2024 | Steffens | B60K 1/02 |

FOREIGN PATENT DOCUMENTS

| | | |
|---|---|---|
| DE | 1019216562 A1 | 4/2021 |
| EP | 3647097 A1 | 5/2020 |
| WO | 2019091719 A1 | 5/2019 |

* cited by examiner

DRIVE UNIT FOR AN ELECTRIC VEHICLE

RELATED APPLICATIONS

This application claims the benefit of and right of priority under 35 U.S.C. § 119 to German Patent Application no. 10 2021 209 593.3, filed on Sep. 1, 2021, the contents of which are incorporated herein by reference in its entirety.

FIELD OF THE DISCLOSURE

The invention relates to a drive unit for an electric vehicle, comprising at least one electric machine, a multi-speed transmission and a distributor device, the rotor of each at least one electric machine being connected to an associated input shaft of the multi-speed transmission, the multi-speed transmission being connected on the output side to the distributor device, different transmission ratios being selectable in the multi-speed transmission, and a drive power introduced into the distributor device being distributable to two outputs of the distributor device via the distributor device. Furthermore, the invention relates to a drivetrain for an electric vehicle comprising a drive unit as mentioned above, as well as to an electric vehicle.

BACKGROUND

Drive units which are often composed of at least one electric machine and a downstream multi-speed transmission are known for electric vehicles. In this case, different gears can be selected in the particular multi-speed transmission in order to transform a drive movement of the at least one electric machine with different transmission ratios. A distributor device can also be part of such a drive unit, via which distributor device a drive movement caused by the at least one electric machine and transformed by the downstream multi-speed transmission is distributed to a plurality of outputs.

For example, DE 10 2019 202 994 A1 describes a drive unit which is intended for use in an electric vehicle and is composed of an electric machine and a multi-speed transmission. The multi-speed transmission in that case comprises two planetary gear sets and a plurality of shift elements, the selective actuation of which makes it possible for different transmission ratios to be selected between an output shaft of the multi-speed transmission and an input shaft of the multi-speed transmission, to which a rotor of the electric machine is connected. In addition to variants in which the drive unit is designed for a single-wheel drive of a drive axle of the electric vehicle, in a variant of DE 10 2019 202 994 A1 a distributor unit is connected downstream of the multi-speed transmission and can distribute a drive movement to drive wheels of a drive axle. The distributor unit is designed here as an axle differential via which a transverse distribution takes place.

SUMMARY

Based on the prior art described above, it is now the object of the present invention to provide a suitable drive unit for an electric vehicle with permanent all-wheel drive or selectable all-wheel drive.

This object is achieved on the basis of the preamble of claim 1 in conjunction with the characterizing features of said claim. The dependent claims following thereupon each state advantageous developments of the invention. A drivetrain for an electric vehicle, said drivetrain comprising a drive unit according to the invention, is additionally the subject of claims 12 and 13. In addition, claim 14 relates to an electric vehicle comprising a drivetrain as mentioned above.

According to the invention, a drive unit for an electric vehicle comprises at least one electric machine, a multi-speed transmission and a distributor device. In this case, the rotor of each at least one electric machine is connected to an associated input shaft of the multi-speed transmission, the multi-speed transmission being connected on the output side to the distributor device. Different transmission ratios can be selected in the multi-speed transmission, while a drive power introduced into the distributor device is distributable to at least two outputs of the distributor device via the distributor device.

The at least one electric machine of the drive unit according to the invention is preferably composed in each case, in a manner known in principle to a person skilled in the art, of a stator and a rotor, each stator being permanently fixed. The latter is accomplished here in particular by the fact that the stator in question is connected in a rotationally fixed manner to a stationary component of the drive unit, which is preferably a housing, a housing part or a component of the drive unit connected in a rotationally fixed manner to the housing. In addition, the at least one electric machine can be operated in the sense of the invention in particular on the one hand as an electric motor as well as on the other hand as a generator, the electric machine in electric-motor operation causing itself a drive movement by means of power supply, whereas it generates current when driven in its generator operation.

In addition to an output shaft, the multi-speed transmission of the drive unit preferably has one input shaft per electric machine, i.e. each electric machine of the drive unit is assigned its own input shaft of the multi-speed transmission. At the output shaft, the multi-speed transmission is connected in particular to the downstream distributor device. Different transmission ratios can be selected in the multi-speed transmission, this being realized in particular by providing different power flow guides within the multi-speed transmission. To provide different transmission ratios, the multi-speed transmission preferably comprises a plurality of different transmission stages, which can be in the form of spur gear stages and/or planetary gear sets. More preferably, the multi-speed transmission has a plurality of shift elements, the selective actuation of which allows the different transmission ratios to be selected. The shift elements can in principle be a frictional engagement shift element, such as in particular a multi-disc shift element, or an interlocking shift element, such as a dog shift element or a lock synchronization arrangement.

In the drive unit according to the invention, the distributor device connected downstream of the multi-speed transmission on the output side is provided for distributing a drive power, made available on the output side of the multi-speed transmission, to two outputs. For this purpose, the distributor device is preferably connected on the input side to an output shaft of the upstream multi-speed transmission. The outputs of the distributor device are formed here in particular at one end of each output shaft of the distributor device and preferably define connection points to which subsequent components in a motor vehicle drivetrain are connected in the installed state of the drive unit. The distributor device has at least two outputs here, with exactly two outputs preferably being provided here.

The invention now comprises the technical teaching that the distributor device is used to provide a longitudinal distribution of the introduced drive power in that the outputs of the distributor device are each provided for coupling to their own drive axle of the electric vehicle. In other words, the distributor device of the drive unit according to the invention is configured to distribute an introduced drive power longitudinally to a plurality of drive axles of an electric vehicle. For this purpose, in an installed state of the drive unit according to the invention, the outputs of the distributor device each serve to connect to their own drive axle of the electric vehicle. Accordingly, in the installed state, an associated drive axle of the electric vehicle is drive-connected to each output of the distributor device.

Such an embodiment of a drive unit has the advantage here that this drive unit can be used as a central drive for a plurality of drive axles of an electric vehicle, which thus also enables a compact embodiment of a drivetrain of the electric vehicle. In this respect, a compact drive concept can be implemented in an electric vehicle with all-wheel drive or selectable all-wheel drive.

An essential feature of the drive unit according to the invention is that the distributor device of the drive unit according to the invention is designed to distribute a drive power to a plurality of drive axles, either permanently or when actuated accordingly. Thus, the distributor unit is formed as a longitudinal distribution unit.

By contrast, the drive unit of DE 10 2019 202 994 A1 is provided for use with a single drive axle of an electric vehicle and is used here either to realize a single-wheel drive or to drive the drive wheels of the associated drive axle.

According to one embodiment of the invention, the at least one electric machine, the multi-speed transmission and the distributor device are accommodated together in a housing. This allows the drive unit to be realized as a compact unit.

According to a further possible embodiment of the invention, the at least one electric machine, the multi-speed transmission and the distributor device are arranged axially adjacently to one another. Particularly preferably, the multi-speed transmission is placed axially between the at least one electric machine and the distributor device, although the components of the drive unit according to the invention can also be arranged axially in a different way within the scope of the invention. Thus, in the case of a plurality of electric machines of the drive unit, a structure can also be selected in which the multi-speed transmission and the distributor device are arranged axially between electric machines. In a development of the above-mentioned embodiment, the at least one electric machine, the multi-speed transmission and the distributor device are also preferably coaxial with respect to one another.

In the context of the invention, "axially" means an orientation in the direction of a longitudinal center axis of the drive unit according to the invention, with shafts of the drive unit also preferably being oriented with their axes of rotation parallel to this longitudinal center axis. In addition, "radially" means an orientation in the diameter direction of a particular component.

As an alternative to the above-mentioned possible embodiment, the at least one electric machine, the multi-speed transmission and the distributor device are placed coaxially with respect to one another, the multi-speed transmission and/or the distributor device being arranged axially in line with the at least one electric machine and radially inwardly of the latter. In this way, a particularly compact design of the drive unit according to the invention can be realized. Here, a coaxial arrangement means in particular that the multi-speed transmission with its associated input shaft and its output shaft or the distributor device with its drive shaft and its outputs is placed coaxially with respect to an axis of rotation of the at least one electric machine.

In a development of the invention, the distributor device comprises a differential transmission, which is designed as a longitudinal differential due to the longitudinal distribution to be provided via the distributor device. In an advantageous manner, a longitudinal distribution of a drive power to a plurality of drive axles of an electric vehicle can take place via a differential gear, thereby enabling speed differences between the outputs of the distributor device. In the context of the invention, the distributor device can, on the one hand, be embodied as a bevel gear differential, whereby a uniform torque distribution to the outputs of the distributor device is carried out. Alternatively, however, an embodiment as a planetary differential in particular is also possible within the scope of the invention, whereby an uneven torque distribution can be realized. Likewise, the distributor device within the scope of the invention can be embodied as a spur gear differential transmission or also as a helical gear differential transmission. In addition, the particular differential transmission can be equipped in each case with a differential lock, the actuation of which forces the outputs of the distributor device to rotate at the same speed.

As an alternative to the above variant, in the distributor device a first output is permanently coupled to an input side of the distributor device, whereas a second output can be rigidly connected to the first output via a clutch. To this extent, in this case the first output is permanently coupled to the drive shaft and thus also to the upstream multi-speed transmission, while the second output is only selected by actuating the clutch, the second output then rotating at the same speed as the first output due to the rigid connection. This embodiment is suitable here for use in an electric vehicle with selectable all-wheel drive in that the second output is connected to the first output only when the clutch is actuated, and thus a power flow guide to the drive axle connected to the second output in the installed state of the drive unit is not implemented until then.

In the aforementioned embodiment, the first output can be rigidly connected to the input side of the distributor device, so that the drive shaft and the first output always rotate at the same speed. Alternatively, however, it is also conceivable within the scope of the invention that at least one transmission stage of the distributor device is provided between the input side and the first output, whereby an additional transmission ratio is realized in the region of the distributor device. This transmission stage can be designed as a spur gear stage or also as a planetary stage. The input side is preferably formed by a drive shaft of the distributor device, the drive shaft also preferably representing an output shaft of the upstream multi-speed transmission.

According to one possible embodiment of the invention, two electric machines are provided, a rotor of the first electric machine being connected to a first input shaft of the multi-speed transmission and a rotor of the second electric machine being connected to a second input shaft of the multi-speed transmission. In an advantageous manner, a drive unit can hereby be provided, in which drive powers of two electric machines can be combined with each other via the downstream multi-speed transmission. In this way, the electric machines can be embodied differently in terms of their drive powers, the smaller electric machine being incorporated into the power flow in an operation with a low, necessary drive power, the larger electric machine being incorporated in the case of a higher, necessary drive power, and both electric machines being incorporated together into the power flow in the case of a highest, necessary drive power. All in all, this makes it possible to realize an efficiently operating drive unit.

According to a further embodiment of the invention, the multi-speed transmission has a plurality of planetary gear sets, each of which has its own first element, second element and third element in the form of a sun gear, a planet web and a ring gear respectively. In addition, a plurality of shift elements are provided, the selective actuation of which causes the different transmission ratios between the associated input shaft and the output shaft to be selectable. The use of planetary gear sets enables a particularly compact design of the multi-speed transmission, and different transmission ratios can also be provided.

The planetary gear sets of the multi-speed transmission of the above-described embodiment are preferably each embodied as a simple planetary gear set, in which the planet web rotatably guides at least one planetary gear in a rotatably mounted manner, said planetary gear being meshed with both the corresponding sun gear and the corresponding ring gear of the planetary gear set. Particularly preferably, however, the individual planetary gear set has a plurality of planetary gears, each of which is received in a rotatably mounted manner in the corresponding planet web. Alternatively, however, individual or even several of the planetary gear sets can each be designed as a compound planetary set, in which at least one planetary gear pair is rotatably mounted in the corresponding planet web. Of the planet gears of the at least one planet gear pair, one planet gear is then meshed with the sun gear and one planet gear is meshed with the ring gear, the planet gears of the planet gear pair also meshing with one another.

The shift elements of the multi-speed transmission are particularly preferably each formed as interlocking shift elements, and they are further preferably each in the form of unsynchronized dog shift elements. However, individual shift elements can also be configured as lock synchronizer arrangements or as frictional engagement shift elements, in particular as multi-disc shift elements.

In a development of the two embodiments described above, the second input shaft of the multi-speed transmission is connected for conjoint rotation to the first element of a first planetary gear set, while the third element of the first planetary gear set is fixed. Furthermore, the second element of the first planetary gear set and the third element of a second planetary gear set are connected to one another for conjoint rotation. Further, an output shaft of the multi-speed transmission is connected for conjoint rotation to the second element of the second planetary gear set, while the first input shaft can be connected for conjoint rotation to the first element of the second planetary gear set via a first shift element. In addition, the first input shaft can also be brought into connection for conjoint rotation to the second input shaft by means of a second shift element. The first element of the second planetary gear set can be fixed to the second input shaft via a third shift element and also can be connected for conjoint rotation to the second input shaft by means of a fourth shift element. Finally, two of the elements of the second planetary gear set can be brought into connection for conjoint rotation to one another via a fifth shift element.

This allows a compact multi-speed transmission to be provided, by means of which the two electric machines of the drive unit can also be incorporated into a power flow in different ways with different transmission ratios. Thus, the second electric machine connected to the second input shaft can be coupled to the output shaft solely by selecting the third shift element, the fourth shift element and also the fifth shift element, with different transmission ratios being implemented in each case. If the second shift element is actuated at the same time, both electric machines can also be integrated into the power flow together. This also allows the first electric machine to be used as the sole drive by means of a connection for conjoint rotation between the first input shaft and the second input shaft, with the second electric machine always being coupled on the second input shaft.

In addition, a superimposition of drive movements of the electric machines on the second planetary gear set can be achieved by actuating the second shift element alone. If, in addition to the second shift element, either the fourth shift element or the fifth shift element is then transferred in each case to an actuated state, it is also possible to provide a sole drive via the first electric machine, although the second electric machine is always coupled on the second input shaft. Overall, different operating modes can be provided via the drive unit by operation of the first electric machine as a generator or electric motor and by operation of the second electric machine as a generator or electric motor.

Particularly preferably, the first element of each planetary gear set is the sun gear, while the second element of each planetary gear set is embodied as a planet web when the planetary gear set is embodied as a simple planetary set and as a ring gear when the planetary gear set is embodied as a compound planetary set. Finally, the third element of each planetary gear set is embodied as a ring gear when the planetary gear set is formed as a simple planetary gear set and as a planet web when the planetary gear set is formed as a compound planetary gear set.

If, in addition, at least some of the shift elements of the multi-speed transmission are embodied as unsynchronized dog shift elements, the speeds at the particular shift element can be synchronized for opening or closing the corresponding unsynchronized shift element by operating one or both electric machines accordingly.

In the aforementioned embodiment, the first shift element and the second shift element are preferably combined to form a shift device, this shift device having an actuating device via which, on the one hand, the first shift element and, on the other hand, the second shift element can each be transferred into an actuated state. Alternatively, but preferably additionally, the third shift element, the fourth shift element and the fifth shift element are combined to form a shift device, this shift device having an actuating device via which the third shift element, the fourth shift element or the fifth shift element is transferrable in each case into an actuated state. Combining shift elements to form shift devices has the advantage here that the shift elements can be actuated with a smaller number of actuating devices. Particularly preferably, the two aforementioned variants are implemented together so that the total of five shift elements can be actuated via only two actuating devices.

The invention additionally relates to a drivetrain for an electric vehicle, the drivetrain comprising a drive unit according to one or more of the aforementioned variants. Advantageously, a particularly compact drivetrain for an electric vehicle with all-wheel drive or selectable all-wheel drive can be provided.

In a development of a drivetrain according to the invention, at least one drivable front axle is drive-connected to one output of the distributor device of the drive unit and at least one drivable rear axle is drive-connected to the other output of the distributor device of the drive unit. Particularly preferably, a drivable front axle and a drivable rear axle are provided in the drivetrain, the front axle and the rear axle each being connected to the associated output of the distributor device of the drive unit according to the invention. Particularly preferably, a drive connection between an output of the distributor device and a drive axle is established via an intermediate cardan shaft.

The invention additionally relates to an electric vehicle, which is particularly preferably an off-road utility vehicle. In this case, the electric vehicle is equipped with a drivetrain corresponding to one or more of the aforementioned possible embodiments.

The invention is not limited to the described combination of features of the main claim or the claims dependent thereon. In addition, there are possibilities for combining individual features, also to the extent that they are apparent from the claims, the following description of preferred embodiments of the invention or directly from the drawings. The reference of the claims to the drawings by use of reference signs is not intended to limit the scope of protection of the claims.

BRIEF DESCRIPTION OF THE DRAWINGS

Advantageous embodiments of the invention, which are explained below, are shown in the drawings, in which.

DETAILED DESCRIPTION

Figure 1:
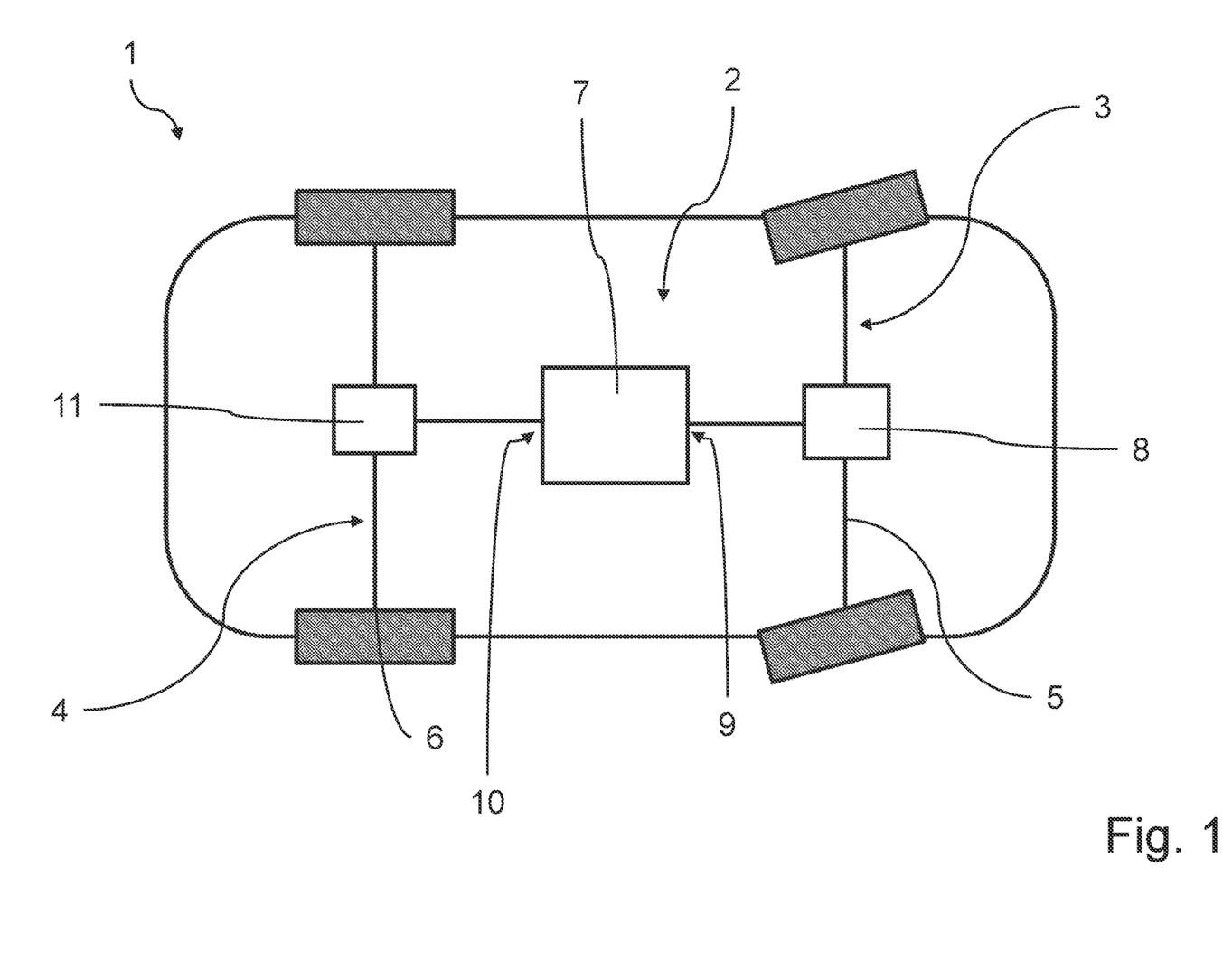
FIG. 1 shows a schematic representation of an electric vehicle according to a preferred embodiment of the invention.

FIG. 1 shows a schematic view of an electric vehicle 1, which is in particular an off-road utility vehicle. The electric vehicle 1 in this case has a drivetrain 2, which is equipped with two drive axles 3 and 4. The drive axle 3 in this case is a steerable front axle 5, and the drive axle 4 is a non-steerable rear axle 6. In this respect, the electric vehicle 1 is equipped with a permanent or selectable all-wheel drive.

Figure 2:
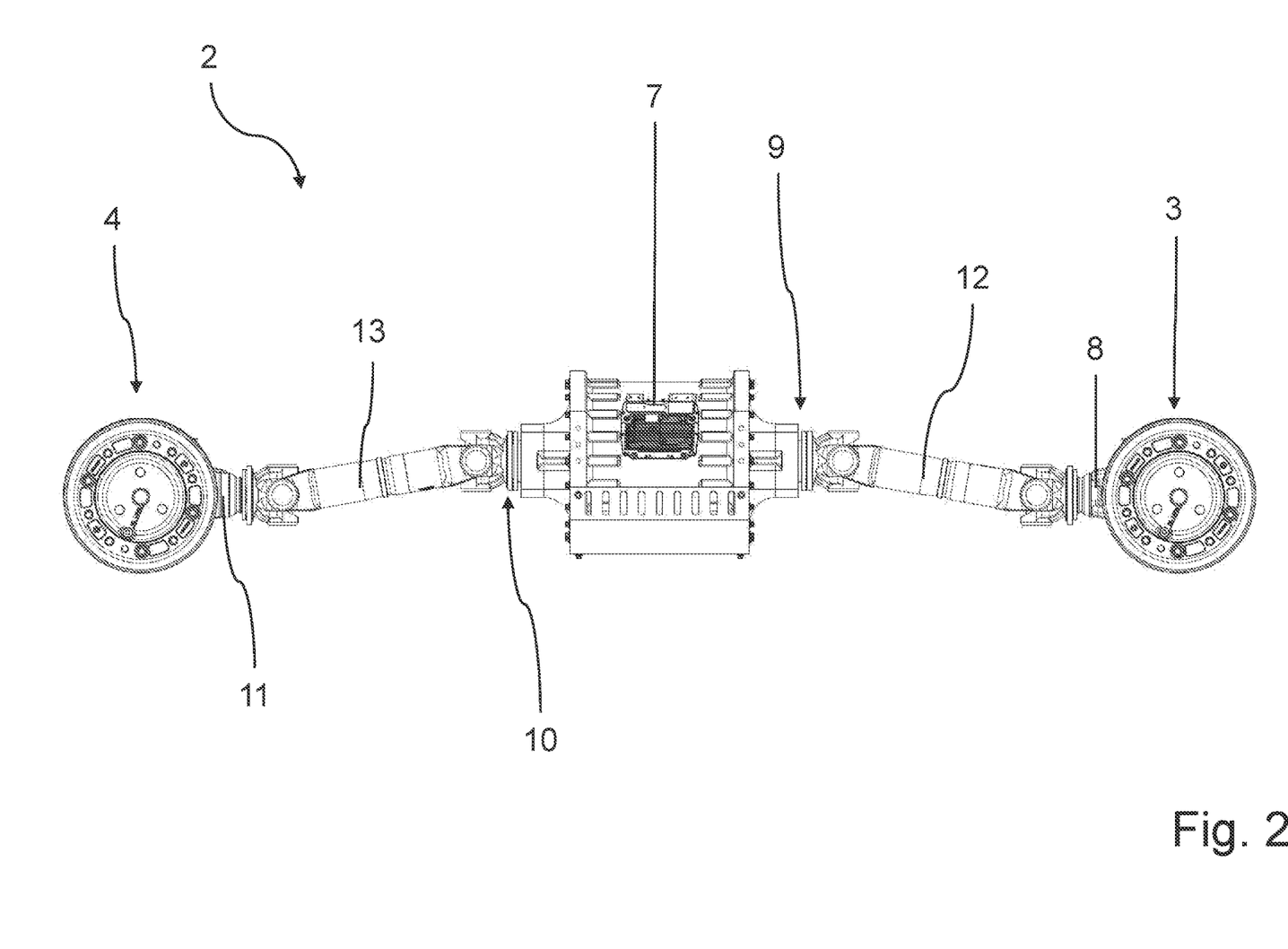
FIG. 2 shows a side view of a drivetrain of the electric vehicle from FIG. 1.

Within the drivetrain 2, the two drive axles 3 and 4 can be driven via a drive unit 7, which is placed in the longitudinal direction of the electric vehicle 1 between the drive axles 3 and 4. Specifically, an axle differential 8 of the drive axle 3 is connected here to an output 9 of the drive unit 7, and the drive unit 7 is furthermore connected to an axle differential 11 of the drive axle 4 at an output 10. As can be seen in the side view of the drivetrain 2 in FIG. 2, the connection of each output 9 and 10 to the corresponding axle differentials 8 and 11 respectively of the corresponding drive axles 3 and 4 respectively is established via an intermediate cardan shaft 12 and 13 respectively.

Figure 3:
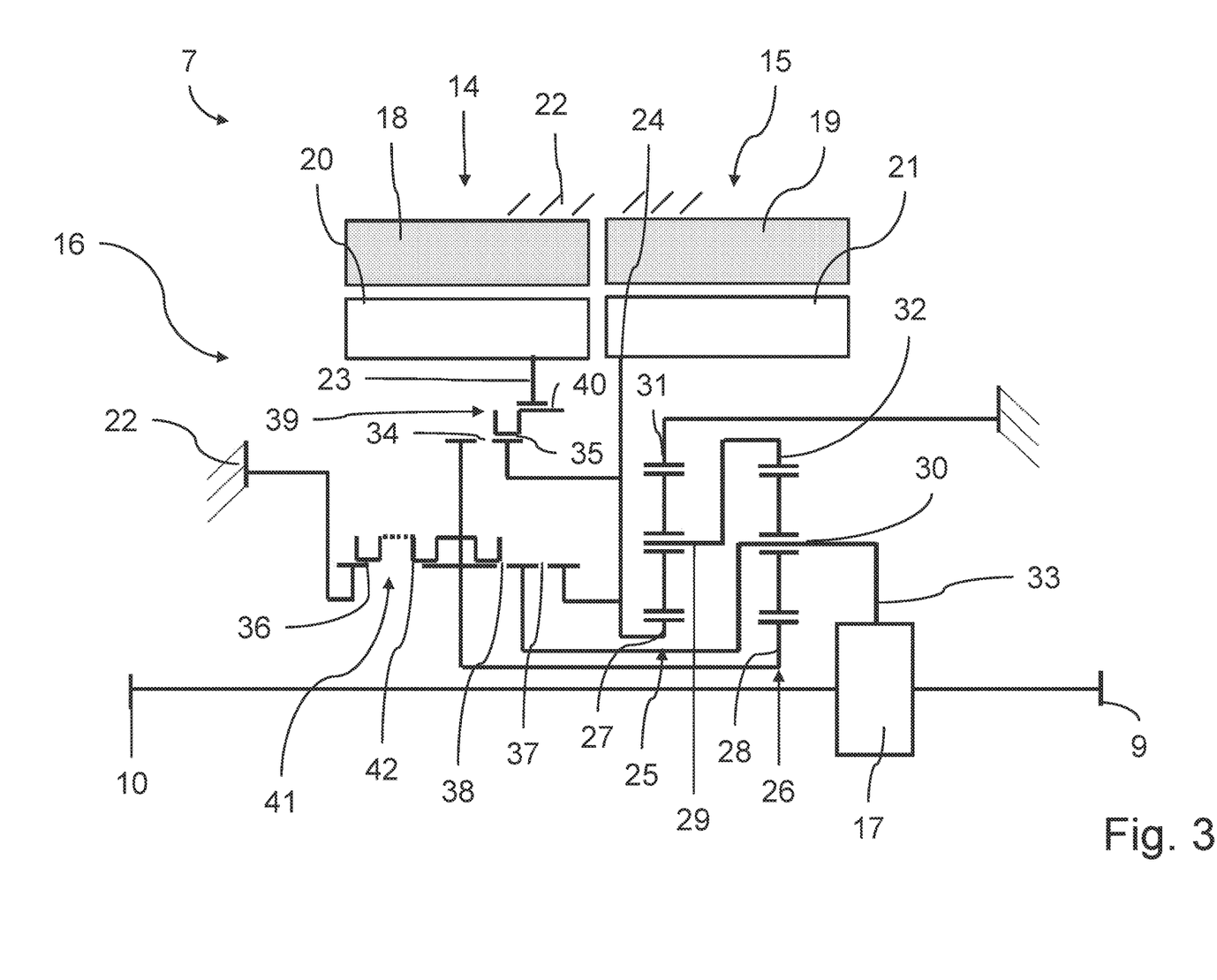
FIG. 3 shows a schematic representation of a drive unit of the drivetrain from FIG. 2, according to a first possible embodiment of the invention.

FIG. 3 also shows a schematic individual representation of the drive unit 7, the drive unit 7 being formed here in accordance with a first embodiment of the invention. In this case, the drive unit 7 comprises a first electric machine 14, a second electric machine 15, a multi-speed transmission 16 and a distributor device 17. The electric machines 14 and 15 each have a stator 18 and 19, respectively, and a rotor 20 and 21, respectively, the stators 18 and 19 of the electric machines 14 and 15, respectively, being permanently fixed to a housing 22 of the drive unit 7. On the one hand, each of the individual electric machines 14 and 15 can be operated in generator operation, in which it generates current when the corresponding rotor 20 or 21 is driven. On the other hand, however, each individual electric machine 14 or 15 can also be operated in electric motor operation, in which case a drive movement of the particular rotor 20 or 21 is produced when an appropriate power supply is provided.

The rotor 20 of the first electric machine 14 is connected for conjoint rotation to a first input shaft 23 of the multi-speed transmission 16, the multi-speed transmission 16 also having a second input shaft 24 which is permanently connected for conjoint rotation to the rotor 21 of the second electric machine 15. In addition, the multi-speed transmission 16 has two planetary gear sets 25 and 26, each of which is composed of a first element 27 and 28, respectively, a second element 29 and 30, respectively, and a third element 31 and 32, respectively.

Each first element 27 and 28 of each planetary gear set 25 and 26 respectively is a sun gear, while each second element 29 and 30 of each planetary gear set 25 and 26 respectively is a planet web. Finally, each third element 31 and 32 of each planetary gear set 25 and 26 respectively is a ring gear. In each planet web, at least one planet gear is rotatably mounted and is in meshing engagement with both the corresponding sun gear and the corresponding ring gear of the particular planet gear set 25 or 26. In this respect, the two planetary gear sets 25 and 26 are designed as simple planetary sets.

Alternatively, one or both planetary gear sets 25 and 26 could be designed as compound planetary gear sets, in which case, compared to the embodiment as a simple planetary gear set, each second element of each planetary gear set is to be formed by the corresponding ring gear and each third element of each planetary gear set is to be formed by the corresponding planet web. In this respect, in this case, a ring gear and planet web connection can be exchanged with each other, and furthermore a stationary transmission ratio of the particular planetary gear set is to be increased by one. In addition, in the case of an embodiment as a compound planetary gear set, at least one planetary gear pair would be rotatably mounted in the corresponding planet web, one planetary gear from the planetary gears of said planetary gear pair being in meshing engagement with the corresponding sun gear and one planetary gear being in meshing engagement with the corresponding ring gear, the planetary gears of the at least one planetary gear pair furthermore meshing with one another.

As can be seen in FIG. 3, the first element 27 of the first planetary gear set 25 is continuously connected for conjoint rotation to the second input shaft 24, while the second element 29 of the first planetary gear set 25 and the third element 32 of the second planetary gear set 26 are permanently connected for conjoint rotation to each other. Furthermore, the third element 31 of the first planetary gear set 25 is continuously fixed in that the third element 31 is permanently connected in a rotationally fixed manner to the housing 22 of the drive unit 7. In addition, the second element 30 of the second planetary gear set 20 is continuously connected for conjoint rotation to a drive shaft 33 of the distributor device 17, by means of which a drive power introduced at the drive shaft 33 is distributed or can be distributed to the two outputs 9 and 10. The drive shaft 33 of the distributor device 17 in this case also forms an output shaft of the multi-speed transmission 16.

The multi-speed transmission 16 also has a total of five shift elements 34 to 38, each of which are interlocking shift elements in the form of unsynchronized dog shift elements. In an actuated state, the first shift element 34 connects the first input shaft 23 and thus also the rotor 20 of the first electric machine 14 for conjoint rotation to the first element 28 of the second planetary gear set 26. By contrast, a closed state of the second shift element 35 results in a connection of the first input shaft 23 for conjoint rotation to the second input shaft 24, so that the two rotors 20 and 21 of the electric machines 14 and 15 thus also rotate at the same speed.

If, on the other hand, the third shift element 36 is brought into a closed state, the first element 28 of the second planetary gear set 26 is fixed to the housing 22 and is consequently prevented from rotating. An actuation of the fourth shift element 37 entails a connection of the second input shaft 24 for conjoint rotation to the first element 28 of the second planetary gear set 26, whereas the fifth shift element 38 in its closed state connects the first element 28 and the second element 30 of the first planetary gear set 26 for conjoint rotation. The latter results here in a locking of the second planetary gear set 26.

By selective actuation of the shift elements 34 to 38, the two electric machines 14 and 15 can be connected in different ways and thus also different operating modes can be provided. Thus, the second electric machine 15 can be coupled to the drive shaft 33 by closing either the third shift element 36, the fourth shift element 37 or the fifth shift element 38, it also being possible to implement an additional incorporation of the first electric machine 14 via the second input shaft 24 by a simultaneous actuation of the second shift element 35.

If, on the other hand, the first shift element 34 is actuated alone, a superimposition of drive movements of the two electric machines 14 and 15 can be caused at the second planetary gear set 20. In addition, if either the fourth shift element 37 or the fifth shift element 38 is actuated in addition to the first shift element 34, a sole drive via the first electric machine 14 can also be realized.

The first shift element 34 and the second shift element 35 are combined in the present case to form a shift device 39, the actuating device 40 of which can cause either the first shift element 34 or the second shift element 35 to be transferred from a neutral position into an actuated state. Likewise, the third shift element 36, the fourth shift element 37 and the fifth shift element 38 are also combined to form a shift device 41, to which an actuating device 42 is assigned. This actuating device 42, when moved out of a neutral position, depending on the position can transfer the third shift element 36, the fourth shift element 37 or the fifth shift element 38 into an actuated state.

As can be seen from FIG. 3, the electric machines 14 and 15, the multi-speed transmission 16 and also the distributor device 17 are arranged coaxially with respect to one another, the multi-speed transmission 16 and also the distributor device 17 being positioned here axially substantially in line with the two electric machines 14 and 15 and radially inwardly of them. The shift devices 39 and 41 are provided here axially in line with the first electric machine 14, while the two planetary gear sets 25 and 26 of the multi-speed transmission 16 and the distributor device 17 are located axially in the region of the second electric machine 15.

Figure 4:
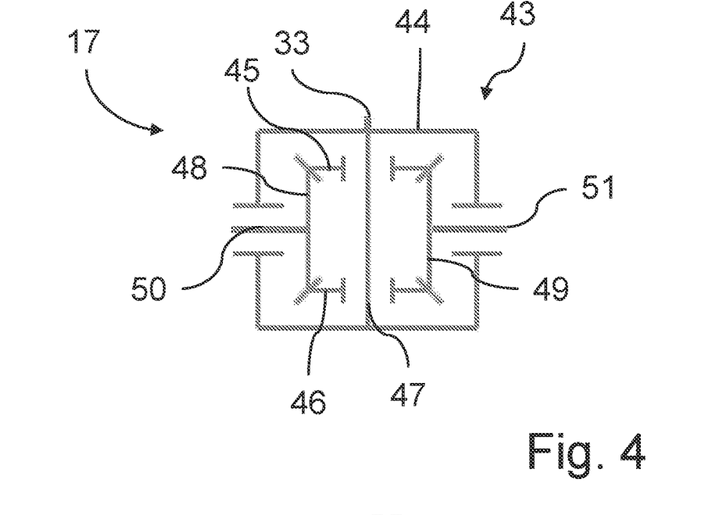
FIGS. 4 to 6 show schematic views of possible embodiments of a distributor device of the drive unit from FIG. 3.
Figure 5:
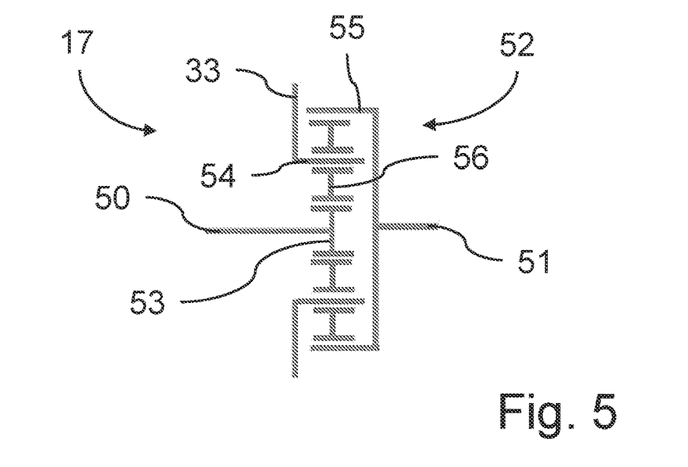
Figure 6:
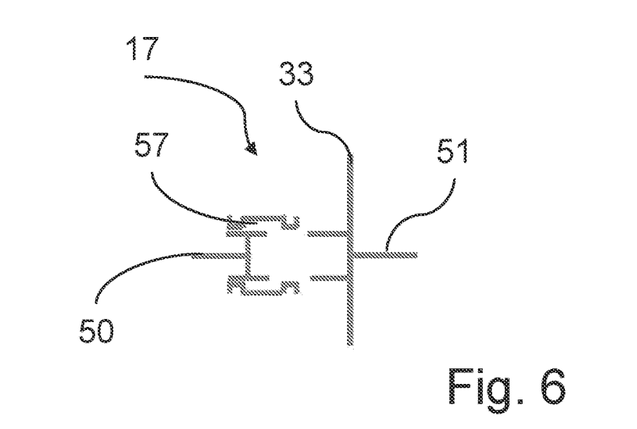

FIGS. 4 to 6 show possible embodiments of the distributor device 17 as they can be implemented in the drive unit 7 from FIG. 3. FIG. 4 shows an embodiment of the distributor device 17 with a bevel gear differential 43, via which a drive power introduced at the drive shaft 33 is distributed to the outputs 9 and 10 and thus to the drive axles 3 and 4 connected thereto in the sense of a longitudinal distribution. In this case, the drive shaft 33 is connected for conjoint rotation to a differential cage 44, in which two differential bevel gears 45 and 46 are each rotatably mounted on a pin 47. The differential bevel gears 45 and 46 mesh with output bevel gears 48 and 49 respectively, each of which is placed for conjoint rotation on an output shaft 50 and 51 respectively. In this case, the output shaft 50 forms the output 10 at one shaft end and the output shaft 51 forms the output 9 at one shaft end. The bevel gear differential 43 distributes the torque evenly here between the two output shafts 9 and 10, possibly compensating for speed differences.

By contrast, FIG. 5 shows a variant of the distributor device 17 in which the distributor device 17 comprises a planetary differential 52. The planetary differential 52 is composed of a sun gear 53, a planet web 54 and a ring gear 55, a plurality of planet gears 56 being rotatably mounted in the planet web 54, each of said planet gears being in meshing engagement with both the sun gear 53 and the ring gear 55. While the planet web 54 is connected for conjoint rotation to the drive shaft 33, the sun gear 53 is connected for conjoint rotation to the output shaft 50, and the ring gear 55 is connected for conjoint rotation to the output shaft 51. The output shafts 50 and 51 in turn form the outputs 10 and 9, respectively, at shaft ends. The planetary differential 52 also distributes torque to the outputs 9 and 10, possibly compensating for speed differences, but, in contrast to the bevel gear differential 43, uneven torque distribution is possible here.

In the possible embodiment of the distributor device 17 shown in FIG. 6, the drive shaft 33 is connected to the output shaft 51 for conjoint rotation, so that the drive shaft 33 and the output shaft 51 always rotate at the same speed. The output shaft 50 can be connected for conjoint rotation to the output shaft 51, and thus also to the drive shaft 33, via an intermediate clutch 57, whereby a drive power introduced at the drive shaft 33 is distributed evenly between the two output shafts 50 and 51 and equal rotational speeds of the output shafts 50 and 51 are forced. In contrast to the two preceding variants according to FIG. 4 or 5, in the embodiment of the distributor device 17 according to FIG. 6, accordingly, no permanent all-wheel drive is realized, since in a disengaged state of the clutch 57 there is no power flow to the output shaft 50 and thus to the output 10. Rather, in the case of the embodiment according to FIG. 6, the all-wheel drive can be selected by actuating the clutch 57.

Figure 7:
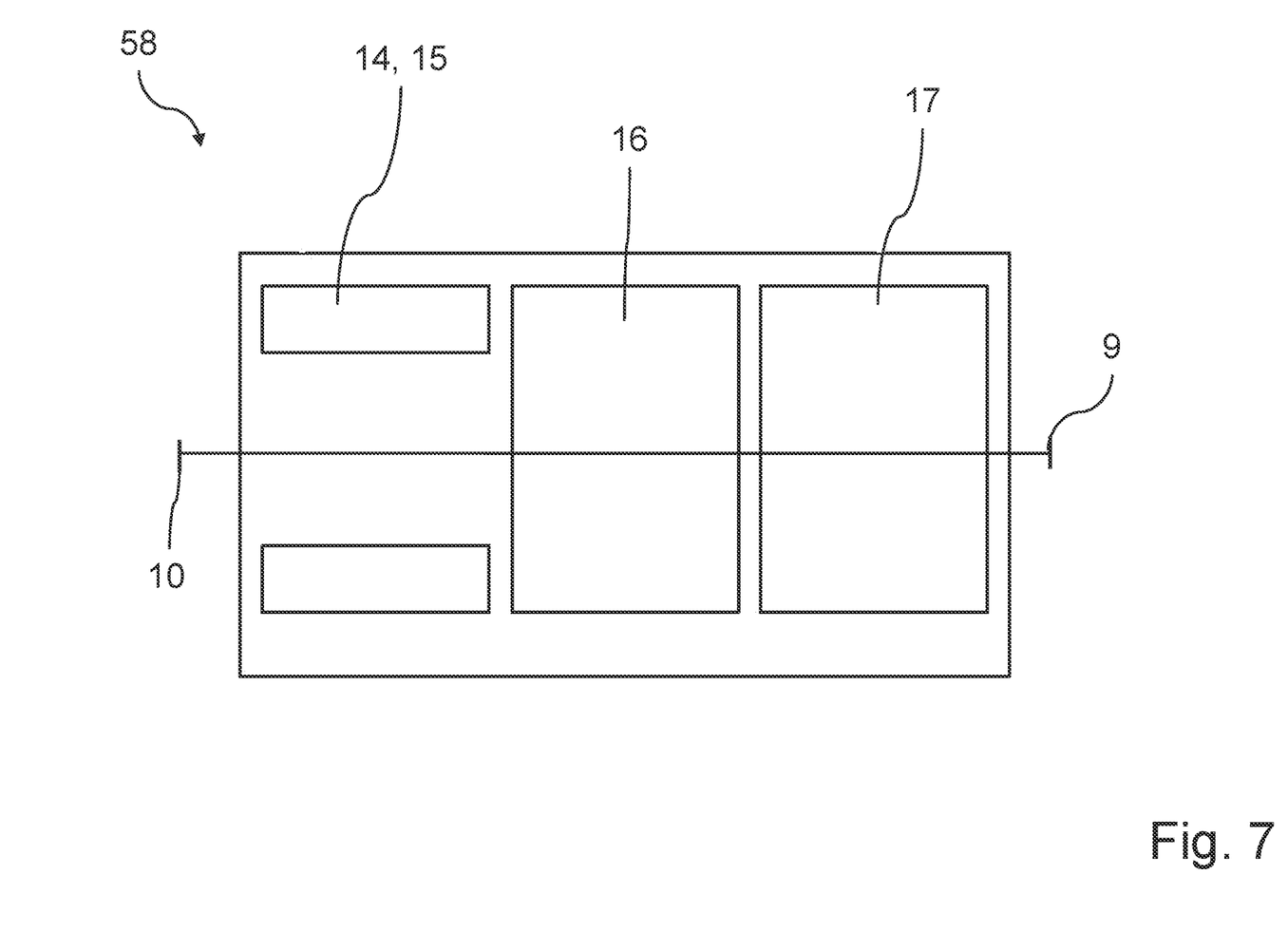
FIG. 7 shows a schematic representation of a drive unit according to a second embodiment of the invention.

Lastly, FIG. 7 shows a schematic view of a drive unit 58, which is realized in accordance with a second possible embodiment of the invention and can be used as an alternative to the drive unit 7 in the drivetrain 2. In contrast to the drive unit 7, in the case of the drive unit 58 the electric machines 14 and 15, the multi-speed transmission 16 and the distributor device 17 are arranged axially in succession, the electric machines 14 and 15, the multi-speed transmission 16 and the distributor device 17 lying coaxially here with respect to one another. In addition, the multi-speed transmission 16 is placed axially between the electric machines 14 and 15 on the one hand and the distributor device 17 on the other hand. Otherwise, the embodiment according to FIG. 7 corresponds to the variant according to FIGS. 3 to 6, and therefore reference is made to the description provided for those Figures.

By means of the embodiments according to the invention, a compact drive unit for an electric vehicle with permanent or selectable all-wheel drive can be provided.

REFERENCE SIGNS

1 electric vehicle
2 drivetrain 3 drive axle
4 drive axle
5 front axle
6 rear axle
7 drive unit
8 axle differential
9 output
10 output
11 axle differential
12 cardan shaft
13 cardan shaft
14 first electric machine
15 second electric machine
16 multi-speed transmission
17 distributor device
18 stator
19 stator
20 rotor
21 rotor
22 housing
23 first input shaft
24 second input shaft
25 first planetary gear set
26 second planetary gear set
27 first element, first planetary gear set
28 first element, second planetary gear set
29 second element, first planetary gear set
30 second element, second planetary gear set
31 third element, first planetary gear set
32 third element, second planetary gear set
33 drive shaft
34 first shift element
35 second shift element
36 third shift element
37 fourth shift element
38 fifth shift element
39 shift device
40 actuating device
41 shift device
42 actuating device
43 bevel gear differential
44 differential cage
45 differential bevel gear
46 differential bevel gear
47 pin
48 output bevel gear
49 output bevel gear
50 output shaft
51 output shaft
52 planetary differential
53 sun gear
54 planet web
55 ring gear
56 planetary gears
57 clutch
58 drive unit

The invention claimed is:

1. A drive unit for an electric vehicle having drive axles, the drive unit comprising:
at least one electric machine having a rotor;
a multi-speed transmission having an input shaft and an output side;
a distributor device having outputs;
a first shift element; and
a second shift element;
wherein the rotor of each at least one electric machine is connected to an associated input shaft of the multi-speed transmission, and the output side the multi-speed transmission is connected to the distributor device;
wherein different transmission ratios can be selected in the multi-speed transmission,
wherein a drive power introduced into the distributor device is distributable to at least two of the outputs of the distributor device via the distributor device,
wherein the distributor device is configured to provide a longitudinal distribution of the drive power introduced into the distributor device so that individual outputs of the distributor device are provided for coupling to a respective drive axle of the electric vehicle, and
wherein the first shift element and the second shift element are combined to form a shift device, the shift device having an actuating device via which, on one hand the first shift element is transferrable into an actuated state, and on another hand the second shift element is transferrable into an actuated state.

2. The drive unit of claim 1, wherein the at least one electric machine, the multi-speed transmission, and the distributor device are accommodated together in a housing.

3. The drive unit of claim 2, wherein the at least one electric machine, the multi-speed transmission and the distributor device are arranged axially adjacently to one another.

4. The drive unit of claim 1, wherein the at least one electric machine, the multi-speed transmission, and the distributor device are coaxially arranged, wherein the multi-speed transmission and/or the distributor device is axially in line with the at least one electric machine and radially inward of the at least one electric machine.

5. The drive unit of claim 1, wherein the distributor device comprises a differential transmission.

6. The drive unit of claim 5, wherein the differential transmission is configured as a bevel gear differential.

7. The drive unit of claim 5, wherein the differential transmission is configured as a planetary differential.

8. The drive unit of claim 1, wherein, in the distributor device, a first output is permanently coupled to an input side of the distributor device, and a second output is rigidly connectable to the first output via a clutch.

9. The drive unit of claim 1, wherein the at least one electric machine includes a first electric machine and a second electric machine, a rotor of the first electric machine being connected to a first input shaft of the multi-speed transmission and a rotor of the second electric machine being connected to a second input shaft of the multi-speed transmission.

10. The drive unit of claim 1, wherein the multi-speed transmission comprises a plurality of planetary gear sets, each of the plurality of planetary gear sets having a first element in the form of a sun gear, a second element in the form of a planet web, and a third element in the form of a ring gear, wherein the first shift element and the second shift element are configured for selective actuation to enable selecting from different transmission ratios between the associated input shaft and an output shaft on the output side.

11. The drive unit of claim 10, further comprising:
a third shift element;
a fourth shift element; and
a fifth shift element;
wherein:
a second input shaft is connected for conjoint rotation to the first element of a first planetary gear set;
the third element of the first planetary gear set is fixed;

the second element of the first planetary gear set is connected to the third element of a second planetary gear set for conjoint rotation;

the output shaft of the multi-speed transmission is connected for conjoint rotation to the second element of the second planetary gear set;

a first input shaft is connectable for conjoint rotation to the first element of the second planetary gear set via the first shift element and can be brought into connection for conjoint rotation to the second input shaft by means of the second shift element;

the first element of the second planetary gear set can be fixed via the third shift element and is connectable for conjoint rotation to the second input shaft by means of the fourth shift element; and two of the first element, second element, and third element of the second planetary gear set can be brought into connection for conjoint rotation to one another via the fifth shift element.

12. The drive unit of claim 11, wherein the third shift element, the fourth shift element, and the fifth shift element are combined to form a second shift device, the second shift device having an actuating device via which a third shift element, the fourth shift element, or the fifth shift element is transferrable in each case into an actuated state.

13. A drivetrain for an electric vehicle, the drivetrain comprising the drive unit of claim 1.

14. The drivetrain of claim 13, wherein at least one drivable front axle is drivingly connected to a first output of the distributor device of the drive unit and at least one drivable rear axle is drivingly connected to a second output of the distributor device of the drive unit.

15. An electric vehicle comprising the drivetrain of claim 13.

16. The electric vehicle of claim 15, configured as an off-road utility vehicle.

* * * * *